Feb. 5, 1957     H. A. DZAACK     2,780,201
DEVICE FOR SIMULTANEOUS REGISTRATION OR INDICATION
OF DIFFERENT UNITS OF MEASURE
Filed Dec. 28, 1954     3 Sheets-Sheet 1

Inventor
H. A. Dzaack

Feb. 5, 1957  H. A. DZAACK  2,780,201
DEVICE FOR SIMULTANEOUS REGISTRATION OR INDICATION
OF DIFFERENT UNITS OF MEASURE
Filed Dec. 28, 1954  3 Sheets-Sheet 2

Inventor
H. A. Dzaack
By Glascock Downing Seebold
Attys.

Feb. 5, 1957 H. A. DZAACK 2,780,201
DEVICE FOR SIMULTANEOUS REGISTRATION OR INDICATION
OF DIFFERENT UNITS OF MEASURE
Filed Dec. 28, 1954 3 Sheets-Sheet 3
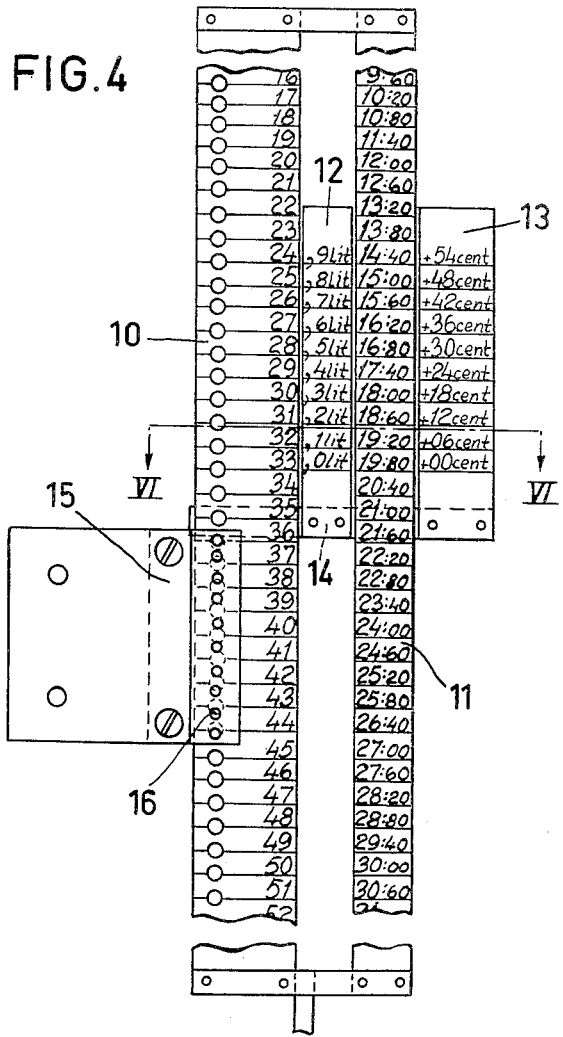

2,780,201

DEVICE FOR SIMULTANEOUS REGISTRATION OR INDICATION OF DIFFERENT UNITS OF MEASURE

Heinz Adolf Dznack, Eskilstuna, Sweden

Application December 28, 1954, Serial No. 478,102

Claims priority, application Sweden December 11, 1954

3 Claims. (Cl. 116—129)

The object of this invention is to make it possible to register or indicate in balances or other measuring devices two or more different quantities. In a balance in addition to the weight also the price and/or the corresponding volume can be registered. The device can be used in all cases in which it is possible to compare two different quantities, for example kilogrammes—litres, kilogrammes—crowns, litres—crowns, millimetres—inches, kilogrammes—pounds, etc.

The device according to the invention is substantially characterized thereby that a first scale indicating the measured result in a first unit of measure and a scale indicating divisional portions of the unit of measure are each connected with another scale indicating corresponding values of one (or more) other quantity, in such a manner that values belonging together will be positioned in an indicating position opposite each other.

Embodiments of the invention are shown in the accompanying drawings.

Fig. 3 shows a section along the line III—III in Fig. 1.

Fig. 4 shows a device of linear type corresponding to that of Fig. 1 for registering volume (litres) and price to be used for example at a petrol pump.

Fig. 6 shows a section along the line VI—VI in Fig. 4.

Figure 1:
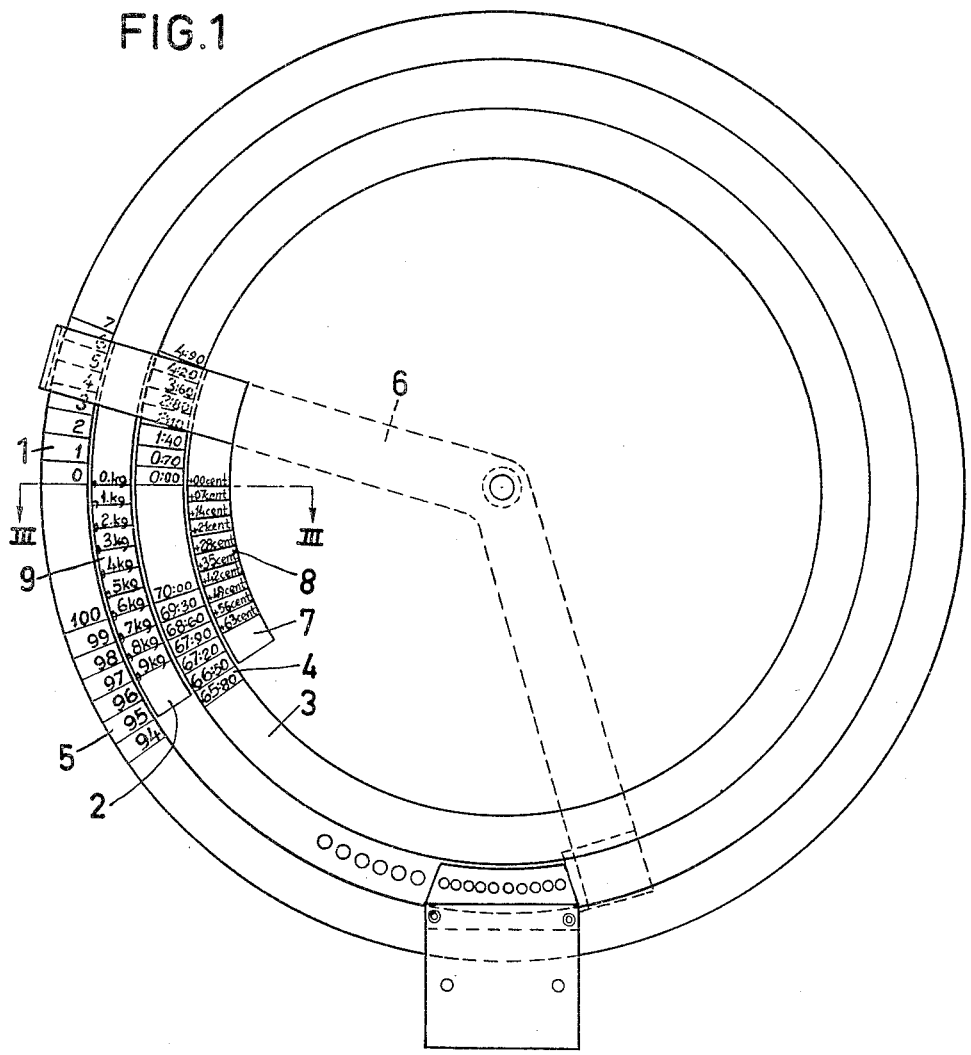
Fig. 1 shows a weighing device of a circular type on which a device according to the invention for registering price has been applied.
Figure 2:
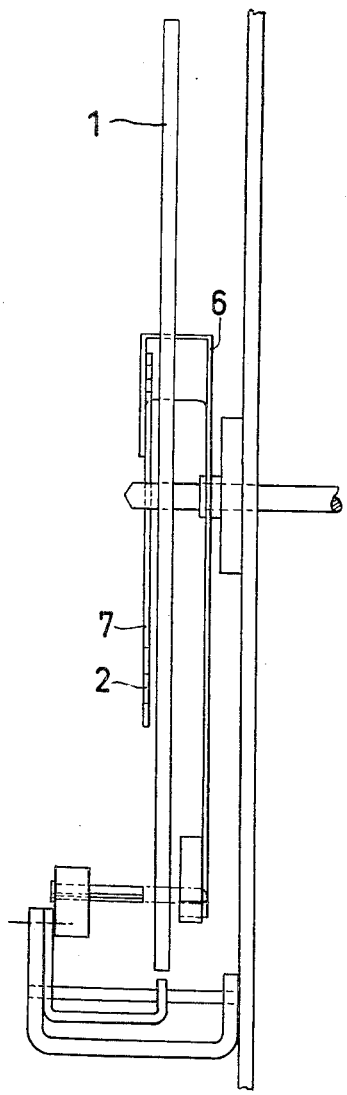
Fig. 2 shows the same device seen from the right in Fig. 1.

The device shown in Figs. 1–3 comprises a scale disc 1 and a secondary decimal scale 2 arranged in accordance with systems already known. On the scale disc there is applied an exchangeable ring 3 provided with printing types 4 which indicate the price corresponding to the printing types 5 on the disc 1. To the arm 6 which carries the decimal scale 2 there is attached still another scale 7 provided with printing types 8 indicating the price which corresponds to the printing types 9 on the decimal scale 2. At registration the scale disc 1 is set in correspondence with the load on the balance. Simultaneously the price corresponding to the load on the ring 3 will assume stamping position. The stamping position corresponds to the line III—III in the drawing. When the decimal scale 2, which in a well-known manner is set by means of "vernier pins" cooperating with equidistant holes in the scale disc 1, is set and brings the decimal or divisional portion of the unit of measure into stamping position, also the corresponding price on the price scale 7 will assume stamping position. Thus, at registration in addition to the weight also the price will be registered, for example 95.7 kilogrammes, 66:50+49 öre. The ring 3 and the scale 7 are so made that they can be easily exchanged in view of changes of price.

Figure 5:
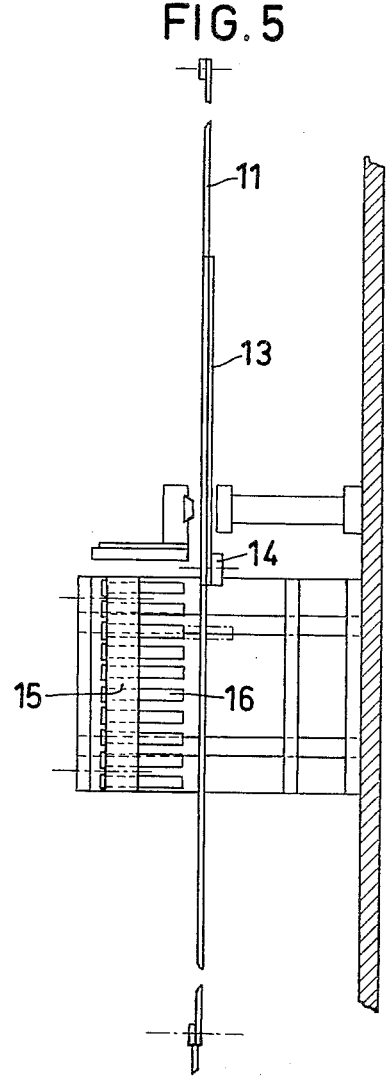
Fig. 5 shows the same device seen from the right in Fig. 4.

The device shown in Figs. 4–6 operates in a similar manner and consists of a linear scale 10 provided with printing types, a price scale 11 being connected to said scale 10. A decimal scale 12 is together with a corresponding price scale 13 attached to an arm 14, which is moved to abutment against that "vernier pin" 16 of an indexing mechanism 15 which has passed through one of the equidistant holes in the scale 10. At registration the scales with the respective numbers in question assume stamping position, and the print shows the number of litres and the price, for example 31.2 litres, 18:60+12 öre. The scales 11 and 13 are made in such a manner that they can be easily exchanged.

It is also possible to provide still other scale for indicating the values of a number of quantities, for example price and volume, corresponding to the value of measurement, for example weight. Thus, in Fig. 1 the scale 3 can be connected to still another scale indicating for example the volume corresponding to the indication of the scale 1, and the scale 7 is connected to a scale indicating the volume value corresponding to the indication of the scale 2.

In the embodiments shown the device for setting the decimal scale is made in accordance with U. S. patent application Serial No. 445,400, the device comprising equidistant holes in the scale disc 1 and pins cooperating with these holes, which pins in relation to said holes are arranged as the lines of a vernier scale in relation to the lines of an appurtenant scale, but the invention is not restricted to this embodiment but can be adapted also to other embodiments of the device for setting the decimal scale. Although the latter scale has been called decimal scale above, it can be graduated with other units than tenths of the units on the scale 1.

Having now described my invention, what I claim as new and desire to secure by Letters Patent is:

1. A device for use in measuring apparatus provided with an indicating portion for simultaneously indicating different units of measure and the proportional parts thereof, comprising a support member including a first scale portion indicating a first unit of measure, a second scale portion on said support member indicating proportional parts of the first unit of measure, a third scale portion carried on said support member indicating a second unit of measure, a fourth scale portion on said support member indicating proportional parts of the third unit of measure, indicating means on said support member indicating corresponding values on the first and third scales, said second and fourth scale portions being connected for simultaneous movement relative to the respective first and third scale portions for presenting a similar proportional part of the respective units of measure at the indicating means.

2. A device as set forth in claim 1, including pairs of additional scale portions on said support member indicating other units of measure and proportional parts thereof, said additional pairs of scale portions being connected to the respective first and third, and second and fourth scale portions for defining other values at the indicating means.

3. A device as set forth in claim 1, wherein said last-mentioned means comprises a vernier assembly for orienting the scales indicating the proportional parts relative to those scales indicating the different units of measure.

References Cited in the file of this patent

UNITED STATES PATENTS

| | | |
|---|---|---|
| 2,092,957 | Cuenoud | Sept. 14, 1937 |
| 2,163,183 | Baagoe | June 20, 1939 |
| 2,249,655 | Hayes | July 15, 1941 |
| 2,452,544 | Brodie | Nov. 2, 1948 |